United States Patent Office

3,763,091
Patented Oct. 2, 1973

3,763,091
DIKETOPIPERAZINE RING CONTAINING COMPOUNDS AND PROCESS FOR PREPARING SAME
Vittorio Crescenzi, Antonio Ciana, Elio Russo, Vincenzo Giancotti, and Luciano Salvestrini, Trieste, Italy, assignors to Snam Progetti, S.p.A., Milan, Italy
No Drawing. Filed Apr. 2, 1971, Ser. No. 130,787
Claims priority, application Italy, Apr. 2, 1970, 22,803/70
Int. Cl. C08g 33/02
U.S. Cl. 260—47 CZ     3 Claims

ABSTRACT OF THE DISCLOSURE

This invention relates to novel polymers which are prepared from a diketopiperazine with a bifunctional compound or with a monofunctional unsaturated compound.

This invention relates to polymers containing a plurality of diketopiperazine rings, and to processes for their preparation.

It is known how to synthesize a diketopiperazine which has the following formula:

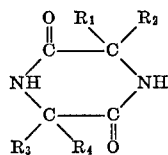

wherein $R_1$, $R_2$, $R_3$ and $R_4$ may be the same or different atoms or atomic groups. The simplest diketopiperazine is the one wherein $R_1 = R_2 = R_3 = R_4 =$ hydrogen; more usually, however, $R_1 = R_3 = H$ and $R_2 = R_4 =$ a radical containing a functional group. Depending on the nature of the substituting groups and on the configuration of the carbon atoms to which the substituting radicals and group are bound, there can be obtained an optically active diketopiperazine derivative.

It is also known that the diketopiperazine may exhibit tautomerism to give the following carbonylic and enolic forms:

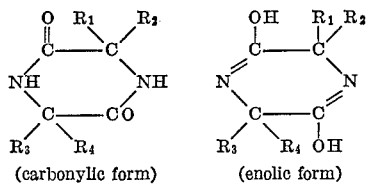

(carbonylic form)     (enolic form)

Their synthesis is generally carried out by starting with the esters of the amino acids which on standing condense to diketopiperazine with the elimination of alcohol; the reaction may be accelerated by rising the temperature. Thus, for instance, from the ethyl ester of glycine, 2,5 diketopiperazine or glycine anhydride is obtained:

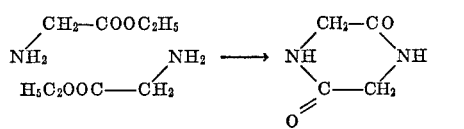 (2)

The synthesis may be also effected by heating free amino acids in diluted glycerine at higher temperatures (e.g. 170° C.) or by heating peptides for a long time in diluted mineral acids (e.g. hydrochloric acid).

We have now found that it is possible to synthesize a whole class of new compounds starting from diketopiperazine presenting the formula:

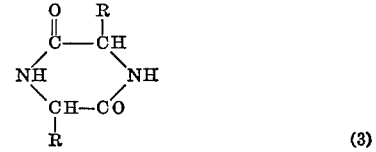 (3)

wherein the R's, which may be the same or different, represent a monovalent hydrocarbon radical possessing at least one functional group.

The hydrocarbon radical R is monovalent because it substitutes a hydrogen atom in the $CH_2$ group of the diketopiperazine ring (2). The "hydrocarbon radical" is to be understood to be any hydrocarbon radical, like alkyl, simple or substituted cycloalkyl, simple or substituted aryl.

Among acylic alkyl radicals the preferred radicals are the ones comprising 1 to 6 carbon atoms; among the cycloalkyl radicals, the simple radicals containing 5 to 6 carbon atoms and the substituted radicals having up to 10 carbon atoms are preferred; among aryl radicals the radicals having 6 to 12 carbon atoms are preferred. Examples of the functional groups possessed by the radicals include halide, hydroxyl, hydrosuluphide and amino groups, di- or trihalogenated groups, oxygenated groups as in aldehydes and ketones, nitriles, isocyanates and carboxylic acid groups. Different functional groups may be present contemporaneously in the one diketopiperazine.

Moreover since the R presenting one or more of the above functions is a hydrocarbon radical possessing at least one functional group, the functional groups can be bound directly to a carbon atom, except where one functional group is bound to said carbon atoms through a different functional group or atom; for instance the amine function may be bound to the carbon atom through an oxygen atom ($ONH_2$, i.e. the aminooxy group). The presence of the functional group in the diketopiperazine compound allows reactions to be carried out with other bifunctional compounds and with suitable techniques to yield addition and/or condensation polymers.

An addition reaction is one wherein no elimination of compounds takes place, and a condensation reaction is one wherein the elimination of simple compounds as water, alcohol, ammonia and the like takes place. Finally by reaction of said diketopiperazine with other unsaturated monofunctional compounds, the addition reaction of molecules by opening unsaturated bonds linking carbon atoms (polymerization) is also possible.

A peculiar object of the present invention is the preparation of particular addition polymers from diketopiperazines in which the functional group is of alcoholic or phenolic nature. Said kind of preparation can be schematized in such a way:

nHO—R—(diketopiperazine)—ROH + nOCNR'—NCO ⟶

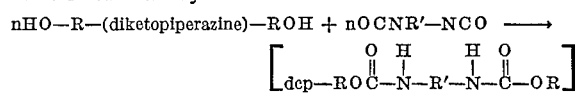

wherein R is a divalent substituent which is selected from $R_1$, $R_2$, $R_3$ and $R_4$ when the functional group is OH; on the contrary R' is a divalent substituent selected from simple or substituted alkylene, cycloalkylene, and arylene. An example of the above class is a polyurethane and it shall be so identified in the present specification wherein "dcp" means diketopiperazine.

Another particular object of the present invention is another class which may be identified as the polyureas obtainable in a similar way to the one described, but starting from a diketopiperazine in which the amine group is the functional group (instead of hydroxyl groups).

A further object of the present invention is the preparation of polyamides starting from diketopiperazine having amino-oxy groups by reaction with bicarboxylic acids and their derivatives according to the scheme:

nNH₂O—R—dcp—R—ONH₂ + nHOOC—R'—COOH ⟶
2nH₂O + [NHO—R—dcp—R—ONH—CO—R'—CO]ₙ wherein R and R¹ are as hereinabove defined.

A further object of the present invention is the preparation of polyesters from a diketopiperazine which is substituted with functional groups of aromatic nature (as for instance phenolic) or of aliphatic nature (alcoholic) which may be prepared by reaction with dicarboxylic acids or their derivatives according to the scheme:

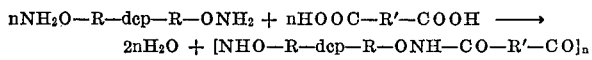

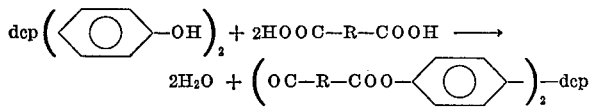

wherein R is the same as hereinabove defined.

To obtain a polymer from unsaturated compounds according to the present invention the following procedure may be followed: the diketopiperazine is condensed with the unsaturated compounds; then the obtained compound is polymerized through the carbon-carbon unsaturation(s). Another example of the compound according to the invention is the one obtained from a diketopiperazine with amino-oxy group capable of reacting with an oxygenated function (aldehyde) in order to yield "Schiff polybases" according to the scheme:

n(dcp)(RONH₂)₂ + n(OCH)₂—R'
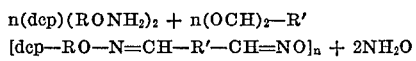
[dcp—RO—N=CH—R'—CH=NO]ₙ + 2NH₂O wherein R and R' are as hereinabove defined.

Since the present invention deals with reaction of difunctional diketopiperazines with other different difunctional compounds, it is not important whether both acid functions belong to the diketopiperazine or to the other bifunctional compound and vice versa or whether the acid functions are mixed on both compounds.

The invention in particular provides the film and fiber forming diketopiperazine polyester condensation product obtained by reacting an optically active bis(hydroxyhydrocarbyl) diketopiperazine with an alkylene dicarboxylic acid, a benzene dicarboxylic acid or a polyester forming derivative thereof.

All the objects of the present invention are attained in a simple and economical way through the following steps:

The diketopiperazines and/or their optically active forms are prepared in a conventional manner, with the desired functional groups;

The DCP obtained in such a way is reacted in a conventional way with compounds capable of adding to or condensing with DCP with the elimination of water or of simple compounds to obtain in such a way addition or condensation polymers; or DCP may be reacted with unsaturated compounds or compounds capable of yielding unsaturated compounds which compounds may be polymerized according to conventional methods.

The compounds obtained according to the invention are interesting from the industrial point of view in that they may have different applications for instance in the synthetic fibers, films, plastic matters for different technological uses.

The products of the invention are characterized in that they present a relatively high melting point, a sufficient solubility in the usual solvents to enable the necessary technological operations to be effected for transforming the above products, a good order degree and crystallinity of the polymer chain. Their molecular weights vary in a wide range. Said compounds may be prepared in form of oligomers as well as of high polymers having high molecular weight.

The addition, condensation and polymerization reactions are conventional. The addition reactions are generally carried out by reacting a diisocyanate with a diol or a diamine, in a melted state or preferably in solution, by suitably adjusting the known experimental techniques (see W. R. Sorensen, T. W. Campbell "Preparative methods of polymer chemistry" 2nd ed., New York, 1968, page 105 and following).

The condensation reactions are carried out by reacting a diol or a diamine with a dicarboxylic acid chloride or directly by reacting a diol or diamine with dicarboxylic acid in the presence of a condensing agent (such as carbonyl diimidazole), or by reacting the diol or diamine, with the bis-imidazolide of the acid; or from a dicarboxylic acid (or corresponding diester) and diol, by polyesterification (or polytransesterification) followed by melt polycondensation (or in solid phase) at reduced pressure and high temperature (op. cit. p. 72; 92; 130).

The addition polymerizations are carried out by free radical or ionic addition to yield linear vinyl chains (op. cit. p. 203 and foll.). The following examples are reported to better illustrate the invention but are not to be intended as limitative thereof.

EXAMPLE 1

44 grams of ethylene oxide in 50 ml. of absolute C₂H₅OH were mixed with the sodium salt of the acetoacetic ester, prepared from 23 g. of sodium in 400 ml. of C₂H₅OH whereto 135 g. of acetoacetic ester were added, in an ice bath, and were kept standing overnight until all ice is completely melted. After removing C₂H₅OH under vacuum; the residue was decomposed with an acetic acid solution and the lactone was extracted with diethyl ether P.E.₃₀=142–143° C.

4 moles of ethyl nitrite were added to 2 moles of aceto-butyrolactone in 500 ml. of CH₃OH obtained in such a way. The reaction was carried out in an ice and salt bath and the mixture was kept standing for 15-20 hours until the temperature of the solution reaches room temperature. The crystalline solid was cooled and filtered. The filtered product was concentrated under reduced pressure and the residue of the brown colour was heated on a vapour bath with 100 ml. of nC₄H₉OH (=nBuOH). The mixture was cooled and filtered. Both crystalline fractions were gathered, washed twice with 100 ml. of cold nBuOH, each then with ether. α-hydroxyimino-γ-butyrolactone was obtained with a yield of 85%; M.P. 183–185° C.

The solution of oxime in anhydrous CH₃OH (about 25 ml./g.) was hydrogenated on palladium (carbon+5% Pd; 1 g. Pd/mole) wherein the hydrogenation was terminated, the liquid was separated from the carbon by filtration and the filtered product was heated under reflux for 48 hours. The product was cooled for 24 hours in a refrigerator. The silky diketopiperazine crystals were separated. Melting point 187–188° C. with decomposition.

EXAMPLE 2

10 grams of N-ε-carbobenzoxy-L-Lysine-methylester chlorhydrate were suspended in 125 ml. of anhydrous ether, distilled on P₂O₅ and the suspension was cooled with a refrigeration bath obtained with acetone and CO₂. Within the cooled suspension a stream of NH₃ was bubbled dried by a soda-lime tower. During the ammonia bubbling, the amino acid dissolved and NH₄Cl precipitated. The operation lasted about 3 hours, the mixture was kept at room temperature for some hours, then ammonium chloride was filtered. The ether solution was evaporated at reduced pressure; an oil remained which was dried under vacuum on CaCl₂, then kept in an oven at 80–90° C. for 3 days. The oil on standing changed into a solid which was repeatedly washed with anhydrous ether, dried and recrystallized from anhydrous ethyl alcohol. ε-dicarbobenzoxy-L-Lysine diketopiperazine melts at 207–210° C.

1.265 grams of ε-dicarbobenzoxy-L-Lysine diketopiperazine were treated with a solution of HBr in glacial acetic acid (7 ml. of glacial acetic acid 45% of HBr+20 ml. of pure glacial acetic acid). The compound dissolved; on standing a white product began to precipitate which was recovered, repeatedly washed with ether and crystallized by hot dissolving it in methanol and reprecipitating with ether. 0.66 gram of L-Lysine diketopiperazine-di-bromohydrate have been obtained amounting to 66% of the theoretical. The compound melts at 283° C. Lysine-diketopiperazine has the structural formula:

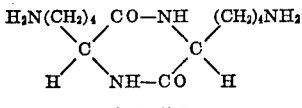

EXAMPLE 3

5 grams of D-cycloserine have been dissolved in 30 ml. of $H_2O$. The solution has been kept on standing for one day, then for one hour at 40° C., thereafter was kept on standing for another day. After 2.5 days from the start of the operation, the triketohydrindene was negative. The solution was therefore treated with 120 ml. of absolute ethanol and a precipitate was obtained. The mixture was kept in a refrigerator for about 7 hours. The product was recovered by filtration; another product was recovered from the remaining solution by addition of ethanol. The total yield was about 84%. Elemental analysis: C=35.14% (calculated 35.30); H: 5.64% (calculated 5.92); N: 26.2% (calculated 27.43).

Alternatively, the same D-3. 6-bis(aminohydroxymethyl)-2,5-diketopiperazine was obtained by adding 5 g. of D-cycloserine to 20 ml. of $H_2O$. The mixture was kept standing at room temperature for 48 hours. During this lapse of time a yellow solution was obtained, then a very large precipitate separated from the above solution.

After 48 hours from the start of the operation the precipitate was recovered by filtration whereas the triketohydrindene test, carried out on the remaining solution, was negative. The product after drying consisted of 1.45 g. The remaining solution was treated with 100 ml. of ethanol and kept standing for one day. Another precipitate was obtained which was recovered and dried (1.85 g.). The total yield was 66%.

*Analysis.*—Calculated for $C_6H_{12}N_4O_4$ (percent): C, 35.30; H, 5.92; N, 27.43. Found (1st fraction) (percent): C, 35.82; H, 6.03; N, 26.50. Found (2nd fraction) (percent): C, 35.34; H, 5.74; N, 26.45.

Both products present the IR spectrum of the products obtained in the preceding preparation. A measurement of the rotary power carried out on a sample of the 1st fraction (second method) gave a $[\alpha]_D^{20}$ value=+58.88° (in $H_2O$, c.=0.835 g./dl.).

EXAMPLE 4

10 grams of 1-tyrosine were mixed with 50 cc. of anhydrous methanol; into the mixture obtained in such a way a stream of gaseous HCl was bubbled until all the 1-tyrosine dissolved as chlorohydrate; the mixture was then kept under reflux for 20' and by subsequent cooling tyrosine chlorohydrate methylester precipitated; the precipitate was filtered and dried under vacuum with a water pump; then the chlorohydrate was dissolved in the minimum amount of distilled water and some small amounts of $K_2CO_3$ were added thereto while controlling that pH should not be higher than 9; thereafter 1-tyrosine methylester precipitated which was repeatedly washed with cold water at the pump; by subsequent crystallization from ethyl acetate fine crystals with a yield of about 60%. Melting point 135–136° C.; rotary power $[\alpha]_D^{20}$=+25.97 (in methyl alcohol). 3 g. of ester obtained in such a way were heated in a vial for ½ hour at 135–140° C.; before heating a nitrogen stream was introduced for about 10', then during the heating the vacuum was obtained with a water pump; a melted mass was obtained which by cooling became red-yellowish. The mass was pulverized and washed three times with a solution of diluted HCl, then the residue was dissolved in 75 cc. of an 25% ammonia solution in water by heating up to boiling. By means of a subsequent treatment with bone charcoal and $NH_3$ elimination under heating, 1-tyrosine anhydride precipitated. Percent C found 66.00 (calc. 66.20); percent H 5.60 (5.57); percent N 8.73 (8.60) melting 270–273° C.; rotary power $$[\alpha]_D^{20}=-223.8°$$

the solution contains 0.2056 g. of anhydride in 1.5 cc. of NaOH+6.5 cc. of $H_2O$. Yield 20%.

EXAMPLE 5

20 grams of asparagine previously dried and finely powdered in 100 ml. of anhydrous $CH_3OH$, by saturating the solution with dried gaseous HCl. The suspension was heated under reflux and a $NH_4Cl$ precipitate was obtained and filtered. The heating was maintained for 2 more hours, then the solvent was eliminated at very reduced pressure. The residue was dissolved in 100 ml. of methanol, the solution was saturated with HCl and kept boiling for 1 hour. In order to isolate the ester, the solvent was eliminated at reduce pressure and the obtained solid mass was decomposed, after solution in little cold water, with $K_2CO_3$ at low temperature, by extracting the dimethylester with ether. After drying the ether solution on $Na_2SO_4$ the solvent was eliminated and an almost colourless, dense liquid was obtained (70% yield) with a boiling point 119–120° C. at 15 mm.

The dimethylester was closed in a glass tube and kept for three days at 100° C. Yellowish crystals were obtained as well as a light brown syrup liquid which was eliminated by washing with little ethyl alcohol and 0.1 N HCl. The yellowish crystals of the diketopiperazine dimethylester have been purified by crystallization from boiling water by obtaining white needle crystals, which dried on $P_2O_5$ have a melting point 245° C., with browning. Yield 30%. Rotary power in trifluoroethanol at 25° C.: $[\alpha]_D^{25}=-69.7°$; 3,6 bis (carbomethoxymethyl) 2,5 diketopiperazine obtained in such a way can be saponified with NaOH 0.1 N at room temperature to 3,6 bis (carboxymethyl) 2,5 diketopiperazine.

EXAMPLE 6

To 0.34 g. of toluenediisocyanate dissolved in 5 ml. of dimethylsulfoxide dried on calcium hydride, 0.4 g. of 3,6 bis (β-hydroxyethyl) 2,5 diketopiperazine dissolved in 5 ml. of DMSO in the presence of triethylamine at 100° C. under a flow of dry nitrogen. After two hours of stirring the reaction mixture was poured in water under stirring. A white precipitate separated which was recovered by centrifugation, washed with $H_2O$, then with $C_2H_5OH$ and dried under vacuum. The product has an intrinsic viscosity in dimethylformamide at 60° C. of 0.27; by the IR analysis the presence of polyurethane was confirmed (DMSO=dimethylsulfoxide).

EXAMPLE 7

0.79 gram of D - 3,6 - bis(aminohydroxymethyl) 2,5 dcp and have the structural formula:

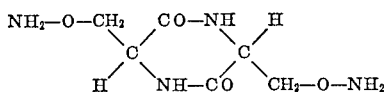

were dissolved at 55° C. in 20 ml. of anhydrous DMSO distilled on $CaH_2$ and treated under stirring with 0.65 g. of hexamethylene-diisocyanate in 5 ml. of DMSO. The solution was kept under stirring at 55° C. and under stream of dry nitrogen. After 10 minutes some drops of triethylamine were added thereto and the mixture was kept under stirring for 4 hours whereafter the heating was stopped and was kept under stirring for 13 hours at room temperature. The obtained solution was poured under stirring in diethyl ether; a viscous oil was obtained which solidifies after addition of anhydrous ethyl alcohol.

The product was recovered by centrifugation, repeatedly washed and in an alternative way with anhydrous ethanol and 95% ethanol respectively, at the end with anhydrous ethanol, then dried under vacuum over CaCl₂. 1.2 g. of products were obtained corresponding to 83% of the theoretical. The intrinsic viscosity in dimethylformamide (=DMF) was 0.15; the IR analysis confirmed the polyurea structure.

EXAMPLE 8

3.6 bis(carbomethoxymehtyl) 2.5 dcp was transesterified and polycondensed with hexandiol; catalyst Ti tetrabutilate; transesterification carried out between 160 and 180° C. for 3 hours; polycondensation at 190–230° C. for 5.5 hours as a total under a continuously growing vacuum until 0.1 mm. Hg. The obtained product was birefringent, insoluble in m-cresol, soluble in H₂SO₄ 96%. Inherent viscosity 0.21. Repeating unit formula:

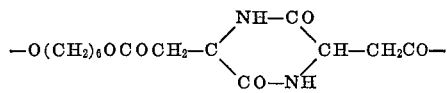

EXAMPLE 9

Equimolecular amounts of D,L-3,6 bis (β-hydroxyethylene) 2,5 dcp and of diimidazolide of the adipic acid (prepared according to Staab, Chem. Ber. 90, 1326, 1957) were suspended in anhydrous toluene and kept under vigorous stirring for seven hours at the boiling temperature of the dispersing medium. At the end of the reaction the suspension was condensed as a waxy mass. After cooling the liquid was decanted and the solid was dried. The solid mass was then treated many times under very vigorous stirring with hot water and centrifugated. After being washed with alcohol and ether the mass was dried under vacuum. The yield was 82%. The inherent viscosity in dichloroacetic acid at 25° C. was 0.84. Repeating unit formula:

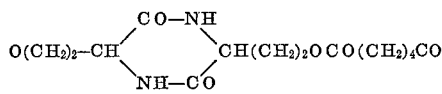

EXAMPLE 10

0.66 gram of L-Lysine dcp dibromohydrate dissolved in 3 ml. of water were treated with 0.3 g. of solid NaOH and rapidly added to 0.295 g. of adipyl chloride dissolved in 20 ml. of anhydrous CCl₄. A bulky precipitate was obtained which contained the present water. The carbon tetrachloride was decanted, the product was washed with acetone, with water, again with acetone and was dried under vacuum over CaCl₂. 0.4 g. of poly-L-lysine dcp adipamide were obtained corresponding to 68% of the theoretical. The polymer was shown to be crystalline by X-ray analysis, and melted with decomposition at about 235° C. and had an intrinsic viscosity of 0.21 dl./g. at 25° C. in a trifluoroethanol solution at 4% v./v. of trifluoroacetic acid. Repeating unit formula:

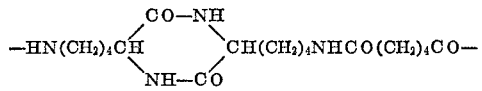

EXAMPLE 11

0.2 gram of D-3.6-bis (aminohydroxymethyl) 2.5 dcp were intimately mixed with 0.3 g. of diimidazolide of the sebacic acid and suspended in 50 ml. of ligroin distilled on Na. The suspension was made to boil and kept under reflux for some hours. The heating was then stopped and the mixture was cooled down until room temperature. The suspended solid was again triturated and the mixture was again made to boil. The operation was repeated four times. From the suspension cooled at room temperature the solid was easily recovered by decantation and then repeatedly extracted under vigorous stirring with boiling DMF, then with H₂O. The remaining product was dried under vacuum over CaCl₂. 0.090 g. of product was obtained corresponding to 27% of the theoretical. Repeating unit formula:

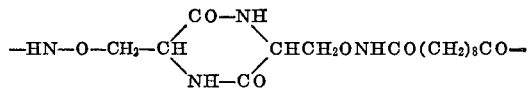

EXAMPLE 12

0.4 gram of D-cycloserine was suspended in 50 cc. of anhydrous diethyl ether, and 0.3 g. of terephthalic aldehyde. The solvent was refluxed for 6 hours. The mixture was cooled and centrifuged to separate the remaining solid, which was washed with anhydrous diethyl ether. The solid was washed again with acetone and kept for 6 hours at 80° C. and 1 mm. Hg. A pulverulent light yellow solid was obtained; yield 90%; intrinsic viscosity in dichloroacetic acid 0.13; $[\alpha]^{25} = +84.2°$ (c.=0.21 g./dl. in CHCl₂COOH). Repeating unit formula:

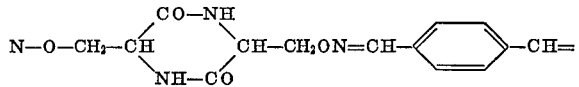

EXAMPLE 13

108.78 mg. of L-tyrosine diketopiperazine (0.33×10⁻³ moles) and having the structural formula:

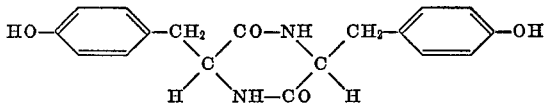

where dissolved under stirring in 6.6 ml. of a 0.10 M sodium hydroxide solution. A solution of 67.67 mg. of isophthaloyl dichloride in 2 ml. of anhydrous dichloroethane was added thereto. Under stirring a white precipitate was obtained which gave rise to a milky emulsion which was broken by addition of acetone (30 ml.). After centrifugation the solid was washed with water, ethyl alcohol and diethyl ether. The product presented a melting point 235/44° and a viscosity $$[\eta]^{25}_{m\text{-cresol}} = 0.22 \text{ (dl./g.)}$$

Repeating unit formula:

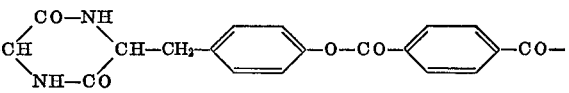

We claim:
1. The film and fiber forming diketopiperazine polyester condensation product obtained by reacting an optically active bis(hydroxyhydrocarbyl) diketopiperazine with an alkylene dicarboxylic acid, a benzene dicarboxylic acid or a polyester forming derivative thereof.
2. The product of claim 1 which is obtained by reacting L-tyrosine diketopiperazine with isophthaloyl dichloride.
3. The product of claim 1 obtained by reacting D,L-3,6 bis(β-hydroxyethylene) 2,5-diketopiperazine with the diimidazolide of adipic acid.

References Cited

Die Makromolekulare Chemie, 120, 1968, pp. 220–224, No. 2934.

Staab Chemische Berichte, Jahrg. 90, pp. 1326–1330, 1957.

HAROLD D. ANDERSON, Primary Examiner

U.S. Cl. X.R.

260—30.8 R, 31.2 N, 32.6 N, 33.4 R, 33.4 UR, 47 CB, 67.5, 75 N, 77.5 AQ, 77.5 CH, 78 R, 88.3 R, 268 DK, 309.7